Feb. 9, 1943.  A. PAOLANTONIO  2,310,648
KNIFE
Filed Nov. 23, 1942
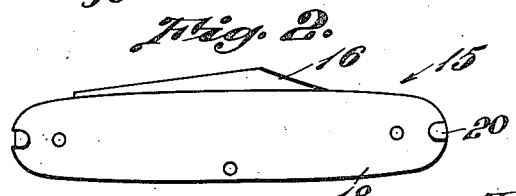
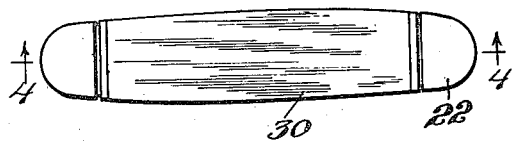
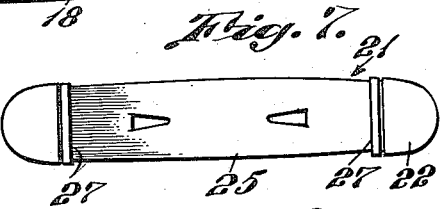
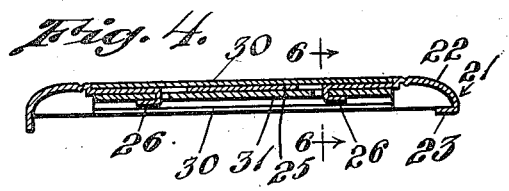
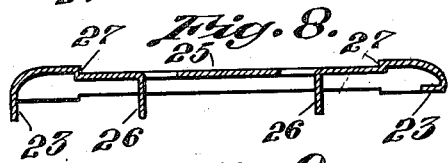
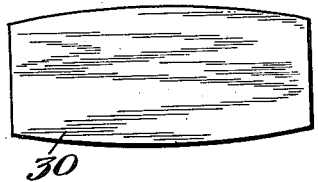
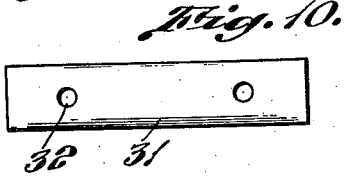
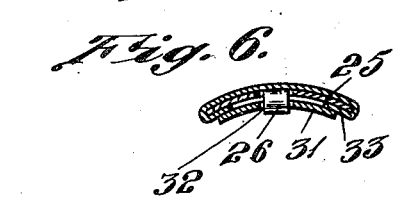
INVENTOR
Antonio Paolantonio
BY Barlow & Barlow
ATTORNEYS Patented Feb. 9, 1943

2,310,648

UNITED STATES PATENT OFFICE 2,310,648

KNIFE

Antonio Paolantonio, Providence, R. I., assignor to Colonial Knife Company, Inc., a corporation of Rhode Island Application November 23, 1942, Serial No. 466,574

6 Claims. (Cl. 30—164)

This invention relates to a knife, more particularly the handle of a pocket knife.

In the use of pocket knives it has been known to provide a cover for the handle part of the knife by wrapping a piece of thin, flexible material such as Celluloid about the shell which is attached to the frame plate and securing this flexible material by tucking the edges beneath the shell plate and binding the edges in position upon assembly of the shell. In many instances such as due to different climatic conditions, the cover would slide or raise at its end, and difficulty was experienced in holding the cover in this form in place.

One of the objects of this invention is to provide a cover which will be more securely held in place and one which does not rely upon a gripping relation between the shell and the frame for holding the cover in position.

Another object of this invention is to provide an arrangement for securing a cover to the shell prior to the assembly of the shell on the knife frame.

Another object of the invention is to provide a knife handle of more attractive appearance and more rigid and durable in use.

With these and other objects in view, the invention consists of certain novel features of construction, as will be more fully described and particularly pointed out in the appended claims.

In the accompanying drawing:

Fig. 1 is a top plan view of a jackknife in which the invention is embodied;

Fig. 2 is a view similar to Fig. 1 but showing the frame and blade of the knife alone;

Fig. 3 is a top plan view showing the shell and its bolsters with the cover attached;

Fig. 4 is a section on line 4—4 of Fig. 3;

Fig. 5 is a sectional view illustrating the frame and blades of the knife with one shell of the handle secured in position and omitting the shell of the handle on the opposite side;

Fig. 6 is a section on line 6—6 of Fig. 4;

Fig. 7 is a top plan view of the shell alone, omitting the cover;

Fig. 8 is a central section of Fig. 7;

Fig. 9 is a top plan view of the flexible cover;

Fig. 10 is a top plan of the binding member.

In proceeding with this invention I have used the same thin, flexible, ornamental cover material such as thin Celluloid and of a sufficient width to tuck under the shell to a sufficient extent to be secured by an independent added binding member which I have provided and which metallic binding member itself may be secured by means of prongs to the shell.

With reference to the drawing, Fig. 2 shows the frame of the knife, designated generally 15, with blades 16 and 17 fitting between the frame plates 18 which are assembled with a spring bar in a known manner and provided with spacers 19. Notches 20 are provided at each end of the frame plate 18 for the assembly of the shell therewith.

The shell is designated generally 21 and is shown alone in Figs. 7 and 8. It is pressed from sheet stock to provide bolsters 22 at either end thereof which are equipped with tabs 23 to fold through the notches 20 and lodge in the recesses 24 in the plate 18 (see Fig. 5). These bolsters are connected by a strip of material 25 which is concave-convex (see Fig. 6) and is provided with prongs 26 cut from the stock thereof and located in spaced relation as shown in Figs. 4 and 8. This strip 25 sets below the bolsters so as to provide shoulders 27 between this strip and the bolsters as shown in Figs. 7 and 8.

The cover, designated generally 30, consists of Celluloid or other flexible material, which is folded about the convex surface of the member 25 and by sharply folding and fixing by such folding the edges of this sheet 34, the edges are located beneath the shell. This ornamental material 30 thus covers the openings formed by cutting and bending down of the prongs 26. The flexible material is held firmly to the shell by a binding member 31 (see Fig. 10) having openings 32 through which the prongs 26 extend to be bent over the surface of the member 31 and hold it firmly against the under side of the shell to bind the edges 33 of the cover material against the under side of the shell and between the binding member 31 and the shell.

In this manner the cover may be assembled upon the shell prior to the securing of the shell to the knife frame and the cover is firmly held in position on the shell between the bolsters and cannot ride up over the bolsters by reason of the shoulders and the secured attachment of the flexible material to its reinforcing member. It is unnecessary that the tabs 23 be strong or that the shell be so strong as to act as a means for binding a cover member in place. Further the binding member may be made sufficiently heavy to reinforce the shell and make a strong handle.

I claim:

1. In a knife having spaced plates providing the frame thereof, a shell secured to said frame, a cover over said shell with its edge portions extending over the edges of the shell and beneath the same, said cover comprising a sheet of thin, flexible material and a binding member on the under side of the shell and secured thereto.

2. In a knife having spaced plates providing the frame thereof, a shell secured to said frame and provided with bolsters at each end, a cover over said shell between said bolsters with its edge portions extending over the edges of the shell and beneath the same, said cover comprising a sheet of thin, flexible material and a binding member on the under side of the shell and secured thereto for binding the edge portions of the cover in position.

3. In a knife having spaced plates providing the frame thereof, a shell secured to said frame, a cover over said shell with its edge portions extending over the edges of the shell and beneath the same, said cover comprising a sheet of thin, flexible material and a binding member on the under side of the shell and prongs on said shell engaging said member for binding the edge portions of said cover in position.

4. In a knife having spaced plates providing the frame thereof, a shell secured to said frame and provided with bolsters at each end, a cover over said shell between said bolsters with its edge portions extending over the edges of the shell and beneath the same, said cover comprising a sheet of thin, flexible material and a binding member on the under side of the shell and prongs on said shell engaging said member for binding the edge portions of said cover in position.

5. A scale for a knife comprising a shell having the end portions thereof in the form of bolsters, a cover located between said bolsters comprising a thin, flexible material extending over the edges of the shell and beneath the same and a binding member on the under side of the shell and means to attach the member to the shell to bind the cover material in position and tabs at the end portions of said shell for attaching the same to the frame of a knife.

6. A scale for a knife comprising a shell having the end portions thereof in the form of bolsters, a cover located between said bolsters comprising a thin, flexible material extending over the edges of the shell and beneath the same and a binding member on the under side of the shell and attached thereto to bind the cover material in position.

ANTONIO PAOLANTONIO.